US008126849B2

(12) United States Patent
Schwan et al.

(10) Patent No.: US 8,126,849 B2
(45) Date of Patent: Feb. 28, 2012

(54) METHOD OF REDUNDANT DATA STORAGE

(75) Inventors: Nico Schwan, Stuttgart (DE); Thomas Strauss, Esslingen (DE); Marco Tomsu, Ditzingen (DE)

(73) Assignee: Alcatel Lucent, Paris (FR)

( * ) Notice: Subject to any disclaimer, the term of this patent is extended or adjusted under 35 U.S.C. 154(b) by 308 days.

(21) Appl. No.: 12/457,367

(22) Filed: Jun. 9, 2009

(65) Prior Publication Data

US 2009/0327364 A1 Dec. 31, 2009

(30) Foreign Application Priority Data

Jun. 27, 2008 (EP) .................................. 08290624

(51) Int. Cl.
*G06F 17/30* (2006.01)
(52) U.S. Cl. ........................................... 707/655
(58) Field of Classification Search .................. 707/635, 707/640, 655, 661, 665; 709/200
See application file for complete search history.

(56) References Cited

U.S. PATENT DOCUMENTS

| | | | | |
|---|---|---|---|---|
| 6,363,462 | B1 * | 3/2002 | Bergsten | 711/162 |
| 6,771,666 | B2 * | 8/2004 | Barker, Jr. | 370/475 |
| 6,928,476 | B2 * | 8/2005 | Bucher | 709/225 |
| 6,937,602 | B2 * | 8/2005 | Whitehill et al. | 370/395.54 |
| 7,904,913 | B2 * | 3/2011 | Sim-Tang et al. | 719/318 |
| 2005/0108276 | A1 * | 5/2005 | Sriram | 707/102 |
| 2006/0026258 | A1 * | 2/2006 | Frank et al. | 709/212 |
| 2006/0190715 | A1 * | 8/2006 | Miller | 713/150 |
| 2006/0190716 | A1 * | 8/2006 | Miller | 713/150 |

(Continued)

FOREIGN PATENT DOCUMENTS

WO WO 2007/138044 12/2007

OTHER PUBLICATIONS

Kristian Waagan, "Building a Replicated Data Store using Berkeley DB and the Chord DHT" Undergraduate Thesis, Aug. 22, 2005, pp. 1-91, URL: http://www.diva-portal.org/ntnu/abstract.xsql?dbid=624.

(Continued)

*Primary Examiner* — Cam-Linh Nguyen
(74) *Attorney, Agent, or Firm* — Harness, Dickey & Pierce, P.L.C.

(57) ABSTRACT

Embodiments of the invention concern a method of redundant data storage in a peer-to-peer overlay network (N), and a network node (211) and a computer program product to execute said method. The peer-to-peer overlay network (N) comprises a plurality of nodes (0, 20, 50, 87, 112, 140, 179, 200, 211, 223, 240). A physical hardware on which a first node (211) of said plurality of nodes (0, 20, 50, 87, 112, 140, 179, 200, 211, 223, 240) runs is identified. At least one second node (240) of said plurality of nodes (0, 20, 50, 87, 112, 140, 179, 200, 211, 223, 240) which runs on a different physical hardware than the first node (211) is determined. A replica (203) of data for which the first node (211) is responsible is stored on the at least one second node (240) in addition to or instead of storing a replica (203) of the data on a next logical node (223) of the first node, whereby said next logical node (223) is a node of the plurality of nodes (0, 20, 50, 87, 112, 140, 179, 200, 211, 223, 240) neighboring the first node (211) with regard to a topology structure of the peer-to-peer overlay network (N).

12 Claims, 3 Drawing Sheets

U.S. PATENT DOCUMENTS

| | | | |
|---|---|---|---|
| 2006/0191020 A1* | 8/2006 | Miller | 726/28 |
| 2006/0215575 A1* | 9/2006 | Horton et al. | 370/252 |
| 2007/0039009 A1* | 2/2007 | Collazo | 719/319 |
| 2007/0208748 A1* | 9/2007 | Li | 707/10 |
| 2007/0230468 A1* | 10/2007 | Narayanan et al. | 370/392 |
| 2008/0072037 A1* | 3/2008 | Narayanan et al. | 713/156 |
| 2008/0098121 A1* | 4/2008 | Wu | 709/229 |
| 2008/0130516 A1* | 6/2008 | You et al. | 370/254 |
| 2008/0147821 A1* | 6/2008 | Dietrich et al. | 709/216 |
| 2008/0221856 A1* | 9/2008 | Dubnicki et al. | 703/21 |
| 2009/0063796 A1* | 3/2009 | Surtani et al. | 711/162 |
| 2009/0265473 A1* | 10/2009 | Hydrie et al. | 709/229 |

OTHER PUBLICATIONS

Stefan Zoels et al., "Load balancing in a Hierarchical DHT-based P2P System" International Conference on Collaborative Computing: Networking, Applications and Worksharing, 2007, Nov. 12, 2007, pp. 353-361, URL: http://ieeexplore.ieee.org/xpls/abs_all.jsp?arnumber=4553855.

Gisik Kwon et al., "Bypass: Topology-Aware Lookup Overlay for DHT-based P2P File Locating Services" Proceedings of the Tenth International Conference on Parallel and Distributed Systems, Jul. 7, 2004, pp. 297-304.

Ion Stoica et al., "Chord: A Scalable Peer-to-Peer Lookup Protocol for Internet Applications" IEEE/ACM Transactions on Networking, vol. 11, No. 1, Feb. 1, 2003, whole document.

Simon Rieche et al., "A Thermal-Dissipation-based Approach for Balancing Data Load in Distributed Hash Tables" Proceedings of the 29th Annual IEEE International Conference on Local Computer Networks, Nov. 16, 2004, pp. 15-23.

Notification of European Publication Number and Information dated Dec. 2, 2009 for Application 08290624.9-1525/2139205.

Salter, James; Antonopoulus, Nick: "ROME: Optimising DHT-based Peer-to-Peer Networks," Proceedings of the Fifthe International Netwrok Conference (Inc 2005), [Online] Jul. 5-7, 2005, pp. 81-88, XP000863947 Samos Island, Greece Retrieved from the Internet: URL:http://www.jamessalter.me.uk/personal/publications/pdf/inc2005FINAL.Pdf [retrieved Aug. 7, 2009].

* cited by examiner

METHOD OF REDUNDANT DATA STORAGE

BACKGROUND OF THE INVENTION

The invention is based on a priority application EP 08 290 624.9 which is hereby incorporated by reference.

The present invention relates to a method of redundant data storage in a peer-to-peer overlay network, and a network node and a computer program product to execute said method.

Peer-to-peer (=P2P) overlay networks are used for a broad number of applications such as VoIP (e.g., Skype) or file-sharing (e.g., eMule) (VoIP=Voice over Internet Protocol). Features like high scalability, self-organisation and fault tolerance are achieved by a distributed architecture and data storage on collectively provided and used resources. The P2P network consists of nodes acting as peers, i.e., both as clients and as servers of the network. In the following description, the terms "node" and "peer" are used interchangeably. Each node of the network maintains one or more logical links to other nodes that are established with respect to an overlay algorithm and used for message transmission.

State-of-the-art P2P networks build a logical topology structure based on overlay specific algorithms that are agnostic of the underlying network infrastructure. Each node maintains one or more links to other nodes that are used for message routing in a broadcast manner (unstructured overlays, e.g. Gnutella) or in an ID-based manner (structured overlays using a Distributed Hash Table (=DHT), e.g. Chord) (ID=identification/identifier). Some systems use hybrid architectures with unstructured groups of peers, and these groups are the structured in a larger topology (e.g. Skype). Advanced P2P networks implement a distributed database (DHT) that requires replication mechanisms to ensure that the stored data persists also in case of an ungraceful leave of a node from the network.

P2P networks are totally decentralised. Peers participating in the overlay may leave the network ungracefully and at random time. Redundant storage by data replication on several nodes guarantees that the data is still available in the network, even after the peer that was responsible for the data has quit the overlay. The redundancy mechanisms are based on overlay specifics, e.g. neighbourhood relationships between peers closely together in the peer identifier space. High availability of the data is achieved by publishing the data on one node that is responsible for the data entry and on one or more nodes that keep a backup entry. Higher availability is achieved by storing multiple replicas on multiple neighbour nodes. In a Peer-to-Peer network based on the Chord algorithm, each peer node replicates the set of resources for which it is responsible on the neighbouring peer nodes in terms of peer ID.

DHTs usually store key/value pairs of data whereas the keys are mapped to the ID space of the nodes. In Chord each node is responsible to store those keys that are equal or smaller than its own ID and greater than its predecessor ID.

Figure 1A:
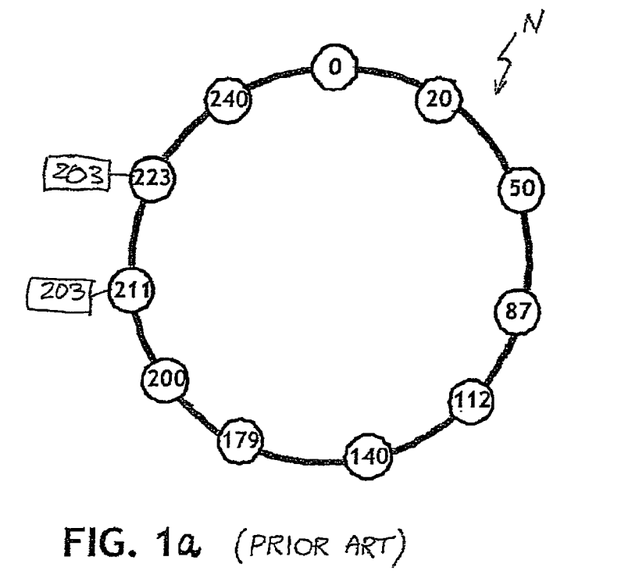
FIGS. 1a and 1b show a prior art structured P2P overlay network.
Figure 1B:
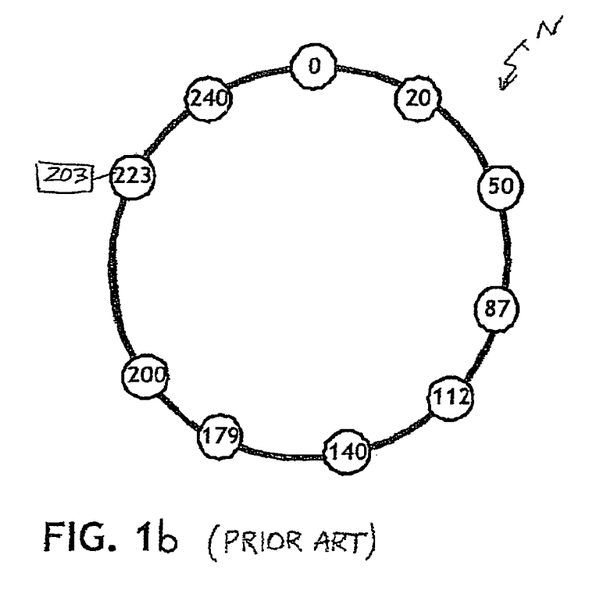

FIG. 1a shows a prior art structured P2P overlay network N comprising a plurality of nodes 0, 20, 50, 87, 112, 140, 179, 200, 211, 223, 240. In particular, FIG. 1a illustrates a Chord ring N. The reference signs 0, 20, 50, 87, 112, 140, 179, 200, 211, 223, 240 of the nodes are meant to represent also the node IDs of the nodes 0, 20, 50, 87, 112, 140, 179, 200, 211, 223, 240. In Chord the nodes maintain direct connections to their predecessor and successor nodes, which results in a ring topology. The node with the node ID 211 is responsible for all keys in the interval {201, 202, . . . , 211}. The key/value pair with the key ID 203 is thus stored on the node 211, and the replicas of the data of node 211 are stored on the successor node 223, as indicated in FIG. 1a. If the node 211 leaves the network N, as shown in FIG. 1b, the node 223 becomes responsible also for the ID space of node 211, including the key 203. Thus the data of node 211 is maintained in the network N.

WO 2007/138044 A1 relates to a P2P communication device, e.g., a PDA, a desktop computer, or a laptop, comprising a memory in which a peer-to-peer identification indication of the P2P communication device is stored, said indication comprising a distinct, non-modifiable part and a modifiable part (PDA=Personal Digital Assistant). A user of the P2P communication device is entitled to freely choose the modifiable part but not able to change the distinct, non-modifiable part which is definitely allocated to the user. For instance, a user is allowed to select the value of a byte to be added to the end of a pre-determined 9-byte UUID in order to form a complete 10-byte UUID (=Unique User Identifier). This is to ensure that two or more P2P communication devices associated with a single user are located close to each other in a P2P network. An advantage of this neighbouring location is that keep-alive messages and information on changes of a neighbour list can be fast exchanged between the P2P communication devices without burdening the IP network underlying the P2P network (IP=Internet Protocol). A disadvantage of this neighbouring location is that it is very likely that the P2P communication devices are connected to the P2P network via the same network entity, e.g., a router. In case this router fails, all the P2P communication devices are disconnected at the same time.

SUMMARY OF THE INVENTION

It is an object of the present invention to provide an improved method of redundant data storage in a peer-to-peer overlay network. Moreover, it is another object of the present invention to provide a corresponding network node and a corresponding computer program product to execute this improved method.

A first object of the present invention is achieved by a method of redundant data storage in a peer-to-peer overlay network comprising a plurality of nodes, the method comprising the steps of identifying a physical hardware on which a first node of said plurality of nodes runs, determining at least one second node of said plurality of nodes which runs on a different physical hardware than the first node, and storing a replica of data for which the first node is responsible on the at least one second node in addition to or instead of storing a replica of the data on a next logical node of the first node, whereby said next logical node is a node of the plurality of nodes neighbouring the first node with regard to a topology structure of the peer-to-peer overlay network. Moreover, a second object of the present invention is achieved by a first node of a peer-to-peer network comprising a plurality of nodes, whereby the node comprises a control unit adapted to identify a physical hardware on which the first node runs, determine at least one second node of said plurality of nodes which runs on a different physical hardware than the first node, and initiate the storage of a replica of data for which the first node is responsible on the at least one second node in addition to or instead of storing a replica of the data on a next logical node of the first node, whereby said next logical node is a node of the plurality of nodes neighbouring the first node with regard to a topology structure of the peer-to-peer overlay network. And a third object of the present invention is achieved by a computer program product for redundant data storage in a peer-to-peer overlay network comprising a plurality of nodes, whereby the computer program product, when executed by a node of said plurality of nodes, performs the steps of identifying a physical hardware on which the first node runs, determining at least one second node of said plurality of nodes which runs on a different physical hardware than the first node, and initiating the storage of a replica of data for which the first node is responsible on the at least one second node in addition to or instead of storing a replica of the data on a next logical node of the first node, whereby said next logical node is a node of the plurality of nodes neighbouring the first node with regard to a topology structure of the peer-to-peer overlay network.

If a replication algorithm is based on the overlay specific node ID only, i.e. without considering the underlying physical hardware, as is the case in the prior art systems, it is possible that two succeeding peers are located on the same physical machine, e.g., a PC (=Personal Computer). If this physical hardware fails, the two neighbour nodes quit the DHT at the same time, and both the original data and the replicated data is lost. Embodiments of the invention solve this problem encountered in the prior art.

Embodiments of the invention introduce a redundant data storage algorithm which is based on the overlay topology specifics but at the same time respects the underlying physical hardware of the P2P overlay network. Embodiments of the invention describe a network node (=logical peer) which includes information about the physical hardware whereon nodes of the network are running into the redundant data storage algorithm of the P2P system.

Unlike prior art where nodes located on the same physical machine (e.g. through virtualisation of Operating Systems, e.g. XEN, VMware) are not aware of this, Embodiments of the invention present a redundant data storage system which identifies the physical hardware on which one or more of the network nodes are running and considers this information about the physical hardware for a suitable redundant data storage.

Embodiments of the invention provide a secure way of redundant data storage. As data replication is a strategy to prevent data loss in case of a node failure, the replication according to an embodiment of the invention does not take place on the same physical node. This is not considered by prior art DHT algorithms. Especially in small deployments (e.g., a network comprising up to a hundred nodes), nodes which are neighbours with respect to their logical ID are hosted on the same physical node (e.g. in virtualisation environments, e.g. VMware, Xen). In prior art where the physical hardware of a node is disregarded, it is therefore likely that data gets lost in case of a hardware failure. An embodiment of the invention avoids this risk by means of a redundant data storage that considers the physical hardware of a node.

Thus, embodiments of the invention are especially helpful in small deployments where the probability that neighbour nodes are hosted on the same physical machine is increased. Embodiments of the invention avoid loss of data due to redundant data storage by means of a mapping of the physical location and the overlay node ID.

Embodiments of the invention increase the availability of stored data. Embodiments of the invention provide that information about the actual hardware is included in the replication strategy.

The new replication strategy according to embodiments of the invention can easily be included in known algorithms for redundant data storage. A node which becomes responsible for a key in case of a hardware failure is responsible for the replica.

Embodiments of the invention support different redundancy levels of replication. And, an assignment of node IDs based on hardware specifics as presented by embodiments of the invention reduces the risk of data loss in case of hardware failures.

In contrast to current P2P overlays where the redundant data storage algorithms are based on overlay specifics, embodiments of the invention provide a solution that considers virtualisation solutions on top of a distributed physical hardware infrastructure for the overlay topology creation and redundant data storage in a P2P network.

Furthermore, this invention describes an improvement for a fundamental technology that can be beneficially used in distributed environments such as server clusters or pure P2P telephony systems. In particular, this kind of technology could be included in IETF P2P-SIP (IETF=Internet Engineering Task Force; SIP=Session Initiation Protocol).

In prior art, it is known to increase the number of replicas of data to be higher than the number of peers of the same user in order to prevent the data from being vulnerable to a single hardware failure. Especially in cluster deployments with a high DB (=data base) operation frequency, each replica causes a significant amount of traffic that might not be acceptable. Also, in deployments of communication networks the method of the prior art document is unpractical as devices with limited capabilities (e.g., phone, PDA) cannot afford to store an increased number of replicas. Embodiments of the invention avoid these disadvantages because only one more replica is necessary, i.e., the number of replicas required is very limited.

Further advantages are achieved by embodiments of the invention indicated by the dependent claims.

According to a preferred embodiment of the invention, if a node running on the same physical hardware as the first node tries to join the peer-to-peer network, a node ID for the joining node is selected so that a pre-defined number of other nodes are located with regard to the topology structure of the peer-to-peer overlay network between the joining node and the first node. Thus, the join procedure known in the prior art is modified so that a maximum distance between peers which are running on the same physical hardware is achieved. The neighbourhood of peers in the overlay is determined by the peer ID. Thus making the ID assignment process hardware dependent helps to avoid situations where two peers that are located on the same hardware become neighbours.

It is possible that the peer ID is assigned by an enrolment server that has information about the cluster topology. This enrolment server, which preferably is a central server, assigns peer IDs in a way that newly joining peers do not become neighbours with peers that are on the same hardware as the newly joining peer.

However in deployments where a central entity is not available a peer which is newly joining the P2P network chooses its ID on its own, e.g. randomly. During the join procedure the peer contacts an admitting peer which is responsible to integrate the new peer into the topology and thus is aware of the neighbourhood topology. The admitting peer might decide to redirect the joining peer if the hardware of the joining peer is in conflict with a peer in the neighbourhood. The joining peer then chooses a different peer ID and tries to join the overlay elsewhere. Thus, according to embodiments of the invention, it is possibly that the joining node is redirected by an admitting node to try to join the peer-to-peer overlay network at another location with regard to the topology structure of the peer-to-peer overlay network. The joining node is admitted by the same or another admitting node not before the pre-defined number of other nodes are located with regard to the topology structure of the peer-to-peer overlay network between the joining node and the first node.

It is possible that the first node detects information about its own hardware and about hardware of other nodes of the network. The goal of this detection is to find out which nodes of the plurality of network nodes are running on a same physical hardware. There are several possible ways to detect the physical hardware:

According to a preferred embodiment of the invention, said physical hardware on which the first node runs is determined by retrieving information from a platform of the first node. Preferably, said retrieval is performed by the first node. In addition to or alternatively to the determination of said physical hardware on which the first node runs, said at least one second node which runs on the same physical hardware as the first node is determined by retrieving information from a platform of the at least one second node. Preferably, said retrieval is performed by the first node. The platform may be a physical hardware on which the first node and/or the at least one second node runs, e.g., a CPU (=Central Processing Unit), a computer, a network unit, etc. The information may be e.g. a CPU ID, a MAC address, a location, an IP address, a location, etc. associated with the platform of the first node and/or the at least one second node (MAC=Media Access Control). This includes any information that a software application is able to find out with the help of the operating system(s) of the network nodes. For instance, the MAC address usually is a relative secure way to determine a physical host, however this might not be the case if hardware virtualisation technology is used.

Embodiments of the invention modify the replication method executed by the Chord peers and thus is able to improve the availability of data in case of physical node failures. Embodiments of the invention associate each peer node to a hardware identifier, e.g., a CPU ID, a MAC address, etc. which identifies the hardware platform hosting the peer node. The peer node uses the hardware identifiers to replicate the set of resources for which it is responsible on at least one peer node running on a different hardware platform, preferably the closest successor in terms of topology structure, e.g., in terms of peer IDs.

According to another preferred embodiment of the invention, said physical hardware on which the first node runs is determined by retrieving information from an external management unit linked or associated with the first node. Preferably, said retrieval is performed by the first node. In addition to or alternatively to the determination of said physical hardware on which the first node runs, said at least one second node which runs on the same physical hardware as the first node is determined by retrieving information from an external management unit linked or associated with the second node. Preferably, said retrieval is performed by the first node. The external management unit may also be an external cluster management entity whereby the term "cluster" refers to the P2P overlay network as a cluster of network nodes.

If an external cluster management entity is available, e.g. to configure the node IDs, the external cluster management entity might also provide information about the physical topology of the cluster. The external cluster management entity may be a central enrolment server, a bootstrap server, or a network management and monitoring server.

If a software application is not able to detect the needed hardware information, a manual (pre-)configuration of the nodes by a manager of the nodes is a solution. Preferably, said physical hardware on which the first node runs is determined by retrieving corresponding information from a network operator of the peer-to-peer network and/or from a user of the first node. Preferably, said retrieval is performed by the first node. In addition to or alternatively to the determination of said physical hardware on which the first node runs, said at least one second node which runs on the same physical hardware as the first node is determined by retrieving corresponding information from a network operator of the peer-to-peer network and/or a user of the at least one second node. Preferably, said retrieval is performed by the first node.

In a preferred embodiment, said physical hardware on which the first node runs is determined by means of a measurement on an application layer associated with the first node. Preferably, said determination is performed by the first node. In addition to or alternatively to the determination of said physical hardware on which the first node runs, said at least one second node which runs on the same physical hardware as the first node is determined by means of a measurement on an application layer associated with the second node. Preferably, said determination is performed by the first node.

Said measurement on an application layer may be an application level probing mechanisms such as "ping" message exchanges. Based on said ping message exchange, nodes can estimate from the connection latency if other nodes are hosted on the same device. Also other already known methods can be used to estimate if nodes are on the same hardware: E.g. network co-ordinate systems try to gain knowledge about the underlying network by measuring some inter-node latency without the need of explicit measurements of all links. This allows putting nodes close together in the logical overlay when they are nearby in a physical topology. Another example is Pastry which adjusts its routing table continuously for locality by measuring the latency to other nodes.

According to another preferred embodiment of the invention, the first node includes a description of the physical hardware on which the first node runs into a P2P message sent from the first node to the next logical node of the first node, wherein the next logical node stores a replica of the data. Possibly, the next logical node of the first node is defined by the fact that the next logical node stores a replica of the data for which the first node is responsible. The next logical node examines whether the physical hardware on which the first node runs is the same as the physical hardware on which the next logical node runs. If the physical hardware on which the first node runs is the same as the physical hardware on which the next logical node runs, the next logical node forwards the replica of the data to the at least one second node.

ID assignment is a means to prevent that peers on the same hardware are located next to each other with respect to the topology structure of the P2P overlay network. As nodes may fail randomly, two peers that actually were not neighbours may become neighbours at any time. In some deployments a possible solution in that case is to reassign the peer ID. However reassignment of peer IDs is not always possible and in addition might have unwanted effects to the overlay structure. For example, a reassignment of a peer ID can also mean that the key space a peer is responsible for changes: it is likely that the peer becomes responsible for totally different key/value pairs. The required data transfer of an actually integrated peer needs time and resources and might be not acceptable.

Thus, according to embodiments of the invention, a replication algorithm of the P2P overlay network is expanded. With the help of the information on the physical hardware that has been retrieved, the data to be replicated is additionally replicated on the next node that runs on a different hardware and that will become responsible for the data in the case of a hardware failure.

Preferably, if a higher redundancy of the redundant data storage is required, the replica of data for which the first node is responsible is stored on so many second nodes each of which runs on another physical hardware such that the total number of the second nodes where the replica is stored and each of which second nodes runs on different hardware becomes equal to a pre-defined redundancy factor.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

Figure 2:
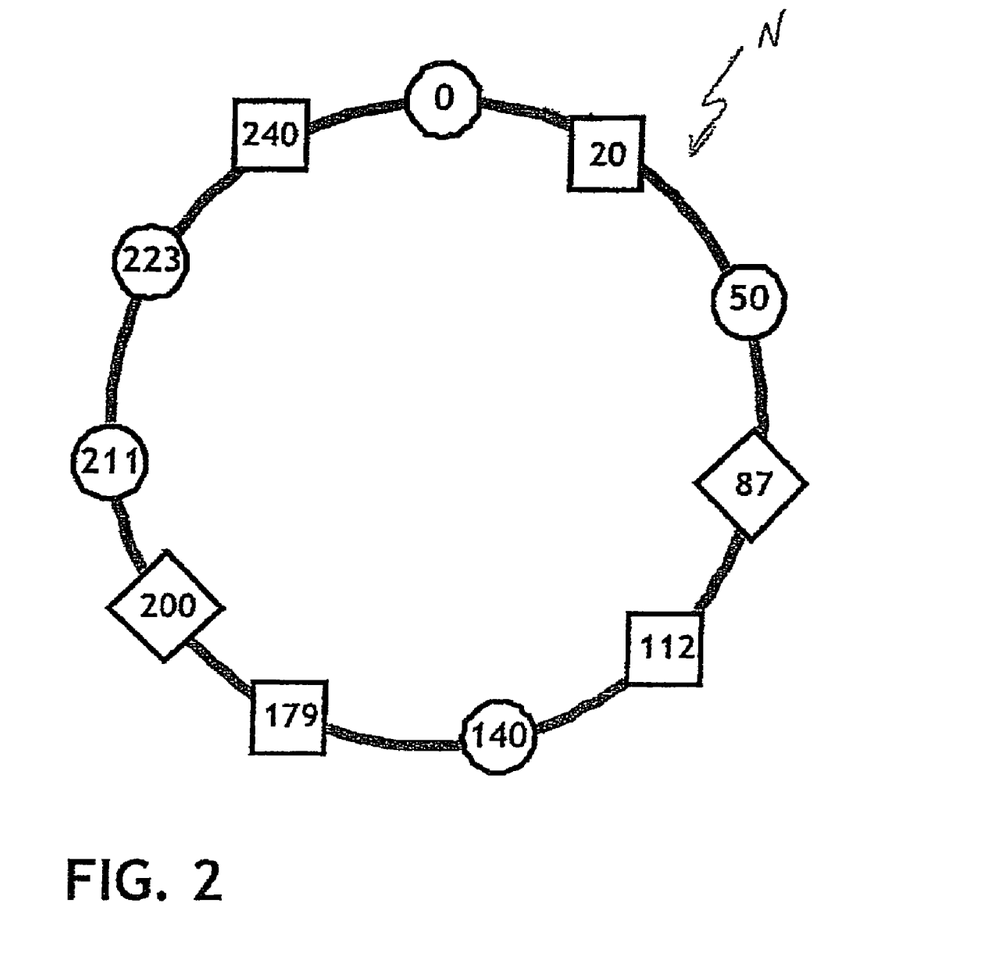
FIG. 2 shows a P2P overlay network according to an embodiment of the invention.

FIG. 2 shows a P2P overlay network according to an embodiment of the invention. In particular, FIG. 2 illustrates a Chord ring N according to an embodiment of the invention. The Chord ring N comprises a plurality of nodes 0, 20, 50, 87, 112, 140, 179, 200, 211, 223, 240 where the reference signs 0, 20, 50, 87, 112, 140, 179, 200, 211, 223, 240 are meant to represent also the node IDs of the nodes 0, 20, 50, 87, 112, 140, 179, 200, 211, 223, 240. The node IDs of the nodes are assigned by the overlay specific DHT algorithm and can for example be based on an enrolment server or chosen randomly by the node itself. Each node represents a peer of the Chord ring N.

In a first step of the method, a first node 211 determines on which physical hardware it is running. And, the first node 211 determines on which physical hardware the other nodes 0, 20, 50, 87, 112, 140, 179, 200, 223, 240 of the Chord ring N are running.

The first node 211 is composed of one or several interlinked computers, i.e., a hardware platform, a software platform basing on the hardware platform and several application programs executed by the system platform formed by the software and hardware platform. The functionality of the first node 211 is provided by the execution of these application programs. The application programs or a selected part of these application programs constitute a computer software product providing a routing service as described in the following, when executed on the system platform. Further, such computer software product is constituted by a storage medium storing these application programs or said selected part of application programs.

From a functional point of view, the first node 211 comprises a control unit for control of the functions of the first node, a storage medium for storing data, and an interface for exchange of information with other nodes.

For the determination of the physical hardware, the first node 211 may use any available information that helps to identify the physical hardware it is running on. It is possible that the first node 211 retrieves information about the physical hardware it is running on by gathering information from its own platform, e.g., a CPU ID, a MAC address, a location, an IP address, etc. Then, the first node 211 may gather corresponding information from the other nodes 0, 20, 50, 87, 112, 140, 179, 200, 223, 240 of the Chord ring N and compare the gathered pieces of information. For instance, if a CPU ID of a computer on which the first node 211 is running is equal to a CPU ID of a computer on which the node 223 is running, the first node 211 arrives at the result that the physical hardware the first node 211 is running on is identical to the physical hardware the node 223 is running on.

Besides the information available from its own platform (e.g. CPU ID, MAC address, location, IP, . . . ), the first node 211 may use information retrieved from an external management entity, provided by means of a manual configuration performed by a user of the hardware the first node 211 is running on, gathered by means of application layer measurements, etc. Likewise, each of the other nodes 0, 20, 50, 87, 112, 140, 179, 200, 223, 240 may use any available information that helps to identify the physical hardware it is running on. It is possible that each of the other nodes 0, 20, 50, 87, 112, 140, 179, 200, 223, 240 communicates the gathered information about the respective physical hardware to the first node 211. It is also possible that the first node 211 accesses the physical hardware on which the other nodes 0, 20, 50, 87, 112, 140, 179, 200, 223, 240 are running on and collects the pieces of information about their respective physical hardware from the other nodes 0, 20, 50, 87, 112, 140, 179, 200, 223, 240.

The result of this step of classifying the physical hardware is illustrated in FIG. 2 which shows the hardware classification and illustrates this by different icon shapes for the nodes 0, 20, 50, 87, 112, 140, 179, 200, 211, 223, 240. Each shape represents another physical machine. That means that the nodes 0, 50, 140, 211, and 223 run on a first machine. The nodes 20, 112, 179, and 240 run on a second machine. The nodes 87 and 200 run on a third machine.

Figure 3:
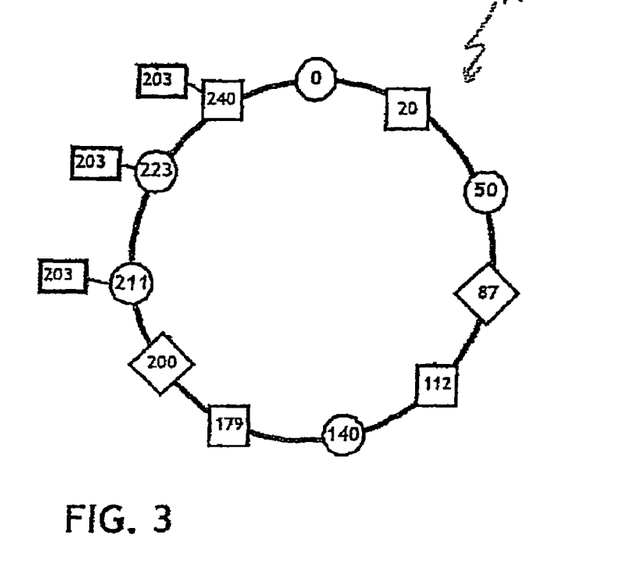
FIG. 3 shows a redundant data storage in the P2P overlay network shown in FIG. 2 according to an embodiment of the invention.

In the state of the art approach, the replica of the key/value pair 203 that is stored on the node 211 is only replicated on node 223, as is shown in FIG. 1a. As illustrated in FIG. 3, an embodiment of the invention provides to additionally or alternatively forward the replicas to the node 240, as nodes 211 and node 223 are hosted on the same hardware.

Determining the responsible peer 240 is done by the node 211 itself, e.g. by querying its neighbours 223, 240, etc. for their hardware information. Alternatively, the node 211 includes its hardware information into a P2P message that is sent to its logical neighbour node 223. Then the node 223 is able to determine that both peers 211 and 223 are hosted on the same physical hardware. In this case, the node 223 forwards the replica 203 from the node 223 to the node 240.

Figure 4:
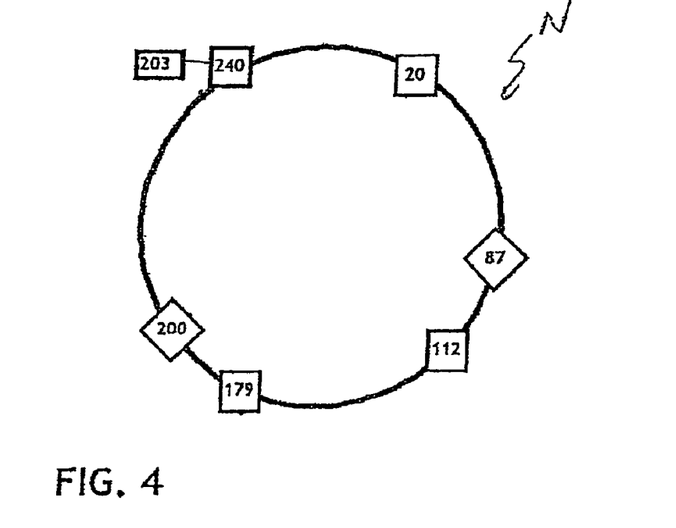
FIG. 4 shows a redundant data storage in the P2P overlay network shown in FIG. 2 according to an embodiment of the invention.

For the case that the nodes 211 and 223 quit the network N because of a hardware failure, as shown in FIG. 4, the node 240 still maintains a copy of the key/value pair 203, thus the data 203 is maintained in the network N.

To get an even higher redundancy factor, a first node has to trigger the storage of the replica on a higher number of peers running on different hardware. For instance, if a redundancy factor of three is requested, the first node 211 has to trigger that the replica data 203 is also stored on the node 87. Thus, the replica data 203 for which the first node 211 is responsible is stored on the node 223 running on a first hardware (=circle in FIG. 2), the node 240 running on a second hardware (=square in FIG. 2), and the node 87 running on a third machine (=rhombus in FIG. 2).

In an advanced implementation there might be several hardware based levels of redundancy. For example, it might be useful to store one replica depending on a different blade, rack, server room or data centre.

The join and leave algorithms according to an embodiment of the invention is modified with regard to the state-of-the-art approaches, in order to ensure consistency of the hardware dependent replicas. In the following description of the join and leave algorithms according to an embodiment of the invention, it is assumed that the procedure where the peers determine on which hardware they are running on has already been completed as described above.

The following abbreviations are used in the description of the algorithm modifications:
LR Replica dependent on logical overlay ID
HR Replica dependent on physical hardware
HRP Position of the HR
NP Neighbour Peer
JP Joining Peer
LP Leaving Peer
1) Join Algorithm
1a) Joining Peer:
If the direct NP to the JP is hosted on the same hardware as the JP, the JP must determine the HRP, which is the next NP that is located on a different hardware. The HR is then pushed to this peer. Otherwise the same peer is responsible for both, LR and HR. In this case only one replica is pushed to the according peer.
1b) Peers that have the JP in the Neighbour List:
The JP possibly has influence on the HRP if the join position is between the peer and its HRP. In this case each peer has to check if its HRP has changed. If it has changed the HR must be pushed to the peer that is now on the HRP and the old HR must be deleted.
2) Leave Algorithm
Peers that have the LP in the Neighbour List:
A LP also possibly influences the HRP if it was between the peer and its HRP or if the LP was on the HRP itself. In this case each peer has to check if its HRP has changed. If it has changed the HR must be pushed to the peer that is now on the HRP and the old HR must be deleted.

The invention claimed is:

1. A method of redundant data storage in a peer-to-peer overlay network having a distributed hash table (DHT) ring topology structure, the peer-to-peer overlay network comprising a plurality of nodes, the method comprising:
   identifying, at the first node, a physical hardware on which the first node runs;
   determining, at another node of the plurality of nodes, at least one second node of said plurality of nodes which runs on a different physical hardware than the first node;
   storing, on the at least one second node, a replica of data for which the first node is responsible, the at least one second node not being a next logical node of the first node, said next logical node is a node of the plurality of nodes neighbouring the first node with regard to a topology structure of the peer-to-peer overlay network; and
   if a node running on the same physical hardware as the first node joins the peer-to-peer network, selecting a node ID for the joining node so that a pre-defined number of other nodes are located with regard to the topology structure of the peer-to-peer overlay network between the joining node and the first node in a way that the joining node does not become a neighbour with nodes that are on the same hardware as the joining node, wherein the node ID is assigned to the joining node by an enrollment server.

2. The method of claim 1, wherein the method further comprises:
   redirecting the joining node by an admitting node to join the peer-to peer overlay network at another location with regard to the topology structure of the peer-to-peer overlay network so that the pre-defined number of other nodes are located with regard to the topology structure of the peer-to-peer overlay network between the joining node and the first node.

3. The method of claim 1, wherein the method comprises:
   identifying said physical hardware on which the first node runs and/or determining said at least one second node by retrieving information from a platform of the first node and/or said at least one second node, respectively.

4. The method of claim 1, wherein the method comprises:
   identifying said physical hardware on which the first node runs and/or determining said at least one second node by retrieving information from an external management unit linked with the first node and/or said at least one second node, respectively.

5. The method of claim 1, wherein the method comprises:
   identifying said physical hardware on which the first node runs and/or determining said at least one second node by means of retrieving corresponding information from a network operator of the peer-to-peer network and/or a user of the first node and/or a user of the at least one second node, respectively.

6. The method of claim 1, wherein the method comprises:
   identifying said physical hardware on which the first node runs and/or determining said at least one second node by means of a latency measurement on an application layer of the peer-to-peer overlay network.

7. The method of claim 1, wherein the method further comprises:
   including, by the first node, a description of the physical hardware on which the first node runs into a peer-to-peer message sent from the first node to the next logical node of the first node, the next logical node storing a replica of the data;
   checking, by the next logical node, whether the physical hardware on which the first node runs is the same as the physical hardware on which the next logical node runs; and
   if the physical hardware on which the first node runs is the same as the physical hardware on which the next logical node runs, forwarding, by the next logical node, the replica of the data to the at least one second node.

8. The method of claim 1, wherein the storing of the replica of data also includes storing the replica of data on a next logical node of the first node.

9. A first node of a peer-to-peer overlay network, the network having a distributed hash table (DHT) ring topology structure, comprising:
   a plurality of nodes, the first node including a controller configured to identify a physical hardware on which the first node runs, determine at least one second node of said plurality of nodes which runs on a different physical hardware than the first node, and initiate the storage of a replica of data for which the first node is responsible on the at least one second node, the at least one second node not being a next logical node of the first node, said next logical node being a node of the plurality of nodes neighbouring the first node with regard to a topology structure of the peer-to-peer overlay network.

10. The first node of claim 9, wherein the storing of the replica of data also includes storing the replica of data on a next logical node of the first node.

11. A computer program product on a storage medium, for redundant data storage in a peer-to-peer overlay network having a distributed hash table (DHT) ring topology structure with a plurality of nodes, whereby the computer program product on the storage medium, when executed by a node of said plurality of nodes, performs the steps of:
   identifying, at a first node, a physical hardware on which the first node runs;

determining, at another node of the plurality of nodes, at least one second node of said plurality of nodes which runs on a different physical hardware than the first node; and initiating, at the at least one second node, the storage of a replica of data for which the first node is responsible, the at least one second node not being a next logical node of the first node, whereby said next logical node is a node of the plurality of nodes neighbouring the first node with regard to a topology structure of the peer-to-peer overlay network; and if a node running on the same physical hardware as the first node joins the peer-to-peer network, selecting a node ID for the joining node so that a pre-defined number of other nodes are located with regard to the topology structure of the peer-to-peer overlay network between the joining node and the first node in a way that the joining node does not become a neighbour with nodes that are on the same hardware as the joining node, wherein the node ID is assigned to the joining node by an enrollment server.

12. The computer program product on the storage medium of claim 11, wherein the storing of the replica of data also includes storing the replica of data on a next logical node of the first node.

* * * * *